United States Patent [19]

Perplies et al.

[11] Patent Number: 4,526,961

[45] Date of Patent: Jul. 2, 1985

[54] PROCESS FOR ETHERIFYING CELLULOSE WITH ALKYL MONOCHLOROACETATES

[75] Inventors: Eberhard Perplies, Walluf; Utz H. Felcht, Bad Soden-Neuenhain, both of Fed. Rep. of Germany

[73] Assignee: Hoechst Aktiengesellschaft, Frankfurt am Main, Fed. Rep. of Germany

[21] Appl. No.: 537,692

[22] Filed: Sep. 30, 1983

[30] Foreign Application Priority Data

Sep. 30, 1982 [DE] Fed. Rep. of Germany ....... 3236158

[51] Int. Cl.$^3$ ..................... C08B 11/193; C08B 11/08
[52] U.S. Cl. ........................................ 536/98; 536/44; 536/90; 536/91
[58] Field of Search ..................... 536/97, 98, 101, 44, 536/90, 91

[56] References Cited

U.S. PATENT DOCUMENTS

| | | | |
|---|---|---|---|
| 2,767,170 | 10/1956 | Graybeal et al. | 536/101 |
| 3,705,890 | 12/1972 | Barker et al. | 536/58 |
| 3,900,463 | 8/1975 | Yada et al. | 536/98 |
| 3,965,091 | 6/1976 | Holst et al. | 536/98 |
| 4,063,018 | 12/1977 | Ohnaka et al. | 536/98 |
| 4,097,667 | 6/1978 | Holst et al. | 536/66 |
| 4,401,813 | 8/1983 | Lowell et al. | 536/98 |
| 4,426,518 | 1/1984 | Omiya | 536/98 |

FOREIGN PATENT DOCUMENTS 50-28981 9/1975 Japan ..................... 536/98

OTHER PUBLICATIONS

"Ullmanns Encyklopaedie der Technischen Chemie", Verlag Chemie, Weinheim/Bergstr., vol. 9, pp. 203–204.

*Primary Examiner*—Ronald W. Griffin
*Attorney, Agent, or Firm*—Schwartz, Jeffery, Schwaab, Mack, Blumenthal & Evans

[57] ABSTRACT

Disclosed is a process for preparing water-soluble sodium carboxymethyl cellulose (NaCMC), including mixed ethers of NaCMC, by etherifying cellulose with alkyl monochloroacetates in an aqueous-alkaline dispersion containing at least one organic solvent. In the process, cellulose is first alkalized in an aqueous-alkaline dispersion, which optionally already contains the organic solvent. Subsequently, the alkali cellulose is reacted essentially with an alkyl monochloroacetate as the etherifying agent, in the presence of the organic solvent.

20 Claims, No Drawings

PROCESS FOR ETHERIFYING CELLULOSE WITH ALKYL MONOCHLOROACETATES

BACKGROUND OF THE INVENTION

The present invention relates to a process for preparing water-soluble sodium carboxymethyl cellulose (NaCMC) by etherifying cellulose with alkyl monochloroacetates.

Water-soluble cellulose ethers have gained a wide variety of applications in practice due to their advantageous characteristics relating to, for example, viscosity behavior, water retention value, surface-activity and film-forming and binding properties. Among the most widely known cellulose ethers are the sodium carboxymethyl celluloses (NaCMC). The sodium carboxymethyl celluloses generally also include mixed cellulose ethers which, in addition to the ionic sodium carboxymethyl groups (NaCM), also comprise non-ionic substituents, such as methyl groups, hydroxyethyl groups and/or hydroxypropyl groups. Mixed cellulose ethers include, for example, sodium carboxymethyl methyl cellulose (NaCMMC), sodium carboxymethyl hydroxyethyl cellulose (NaCMHEC) and sodium carboxymethyl methyl hydroxypropyl cellulose (NaCMMHPC). Sodium carboxymethyl celluloses of these types are used, for example, in the following technical fields and products: production of detergents, oil drilling, mining, textile industry, paper manufacturing, adhesives and coating materials, foodstuffs, cosmetics and pharmaceutical preparations.

In the prior art, a number of continuous and discontinuous processes for the production of cellulose ethers are disclosed [see, e.g. "Ullmanns Encyklopaedie der technischen Chemie" - "Ullmann's Encyclopedia of Industrial chemistry" - Verlag Chemie, Weinheim, 4th edition, volume 9 ("Butadien" to "Cytostatika"), 1975, keyword "cellulose ethers", pages 203/204]. These processes are essentially based on two fundamental principles:

etherification is carried out in an aqueous-alkaline medium, or etherification is carried out in an aqueous-alkaline medium which additionally comprises an organic solvent, e.g., isopropanol or tert.-butanol, (slurry, dispersion).

In the two process variants, free monochloroacetic acid or a salt thereof (usually sodium monochloroacetate) can be used as the etherifying agent. As alternatives for these etherifying agents, corresponding esters have also been disclosed.

According to German Offenlegungsschrift No. 2,062,245 (corresponding to U.S. Pat. No. 3,705,890) or German Auslegeschrift No. 2,556,754 (corresponding to U.S Pat. No. 4,097,667) cellulose or cellulose derivatives, for example, cellulose ethers, are reacted with chloroformic acid esters in the presence of a base, these esters reacting, as a rule, in a bi-functional manner and yielding water-insoluble reaction products.

In the process for preparing alkali carboxymethyl cellulose according to U.S. Pat. No. 3,900,463, cellulose is first caused to interact with an etherifying agent selected from the group consisting of alkali monochloroacetate and alkyl monochloroacetate, in a solvent system composed of water and at least one organic solvent, until the etherifying agent is uniformly distributed within the cellulose mass. The etherifying agent is used in an amount ranging from 0.4 to 2.0 moles per mole of cellulose. It is only after this primary mixing with the etherifying agent that alkalization, using not less than 2 moles of alkali hydroxide per mole of chloroacetate, and the actual etherifying reaction are carried out. Suitable organic solvents include alkanols, alkane-diols and alkane-triols having an alkyl group containing from 2 to 4 carbon atoms, alkoxy-alkanols having an alkoxy group containing from 2 to 4 carbon atoms, aromatic hydrocarbons or dialkyl ketones having alkyl groups contaning from 1 to 4 carbon atoms. The solvent system is used in an amount of not less than 2 parts by weight, preferably from 6 to 16 parts by weight, per part by weight of cellulose. In the first treatment step, the reaction time is about 1 h, at a temperature below 40° C., followed by the alkalization step at approximately the same temperature and for the same duration. The actual etherifying reaction is carried out for several hours at 60° to 80° C. It is pointed out that the particular advantages resulting from the use of alkyl monochloroacetates, as compared with alkali monochloroacetates are a) better solubility of the alkyl monochloroacetates in organic solvents, b) higher reaction activity, c) improved selectivity of reaction, and d) smaller amounts of required organic solvents. The NaCMC types prepared with the esters used as the etherifying agents exhibit viscosities ranging between 106 and 180 mPa.s, as measured in a 1% strength aqueous solution, at DS values from 0.70 to 1.06 (as indicated in Examples 24 to 27).

When the procedure described in U.S. Pat. No. 3,900,463 is carried out in practice it is found, however, that subsequent alkalization gives rise to a loss in the yield of reacted etherifying agent, which may presumably be ascribed to the fact that side reactions between the alkyl monochloroacetate to be reacted and the alkalizing agent are more likely to occur in a subsequent alkalization than in the case of alkali cellulose being present before the etherifying step. In addition, it is impossible, according to the process of U.S. Pat. No. 3,900,463, to produce a NaCMC which has very high viscosities, for example, of 50,000 mPa.s, 100,000 mPa.s, or even higher, measured (according to Hoeppler) at 20° C. in a 1.8% strength aqueous solution. It is similarly impossible to produce a NaCMC having very high viscosities according to any of the other above-mentioned methods of preparing NaCMC, nor can this be achieved in an experimental procedure operating with superposition of an inert gas, such as, for example, nitrogen.

SUMMARY OF THE INVENTION

It is therefore an object of the present invention to provide an improved process for preparing water-soluble NaCMC.

Another object of the present invention is to produce a water-soluble NaCMC having a substituting yield as high as possible.

Yet another object of the invention is to produce a water-soluble NaCMC exhibiting extremely high viscosities.

In accomplishing the foregoing objects, there has been provided in accordance with the present invention, a process for preparing water-soluble sodium carboxymethyl cellulose comprising the steps of alkalyzing cellulose in an aqueous-alkaline dispersion to produce an alkali cellulose, and subsequently etherifying the alkali cellulose with an etherifying mixture comprising alkyl monochloroacetate in the presence of an organic solvent to produce a sodium carboxymethyl cellulose.

In a preferred embodiment, the etherifying mixture comprises from about 1.2 to 8 moles of alkali metal hydroxide, from about 0.4 to 5 moles of alkyl monochloroacetate, from about 3 to 25 moles of water, all per mole of cellulose, and from about 6 to 25 parts by weight of organic solvent mixture comprising water and an organic solvent, per part by weight of cellulose.

Further objects, features and advantages of the present invention will become apparent from the detailed description of preferred embodiments which follows.

DETAILED DESCRIPTION OF PREFERRED EMBODIMENTS

The process according to the present invention can be carried out either continuously or discontinuously in conventional equipment for cellulose ether chemistry (e.g. kneaders, agitator vessels or impeller mixers). If the temperature of the reaction mixture is chosen to be higher than the boiling temperature of the mixture of organic solvent/etherifying agent/water, it is advisable to carry out the process of the invention in a pressure apparatus. It is also customary to use a pressure apparatus, if reactants are employed which are already in a gaseous state under normal conditions (normal pressure, room temperature), for example, if ethylene oxide is used as the second etherifying agent in the preparation of mixed ethers. The constituent amounts of components indicated below merely reflect the sum of the amounts of the components required for the reaction at the beginning of the etherifying step. For example, following the alkalizing step, part of the cellulose and the alkali metal hydroxide are present in the form of alkali cellulose. Additionally, the amount of alkali metal hydroxide required for the reaction includes that amount necessary for the actual etherification reaction, as well as for the hydrolysis of the alkyl monochloroacetates.

The alkyl monochloroacetates particularly include those which comprise alkyl groups having from about 1 to 4 carbon atoms, for example, methyl monochloroacetate, ethyl monochloroacetate or isopropyl monochloroacetate. These known compounds are, under normal conditions, strongly odorous liquids which have fusing points (FP) below about $-25°$ C. and boiling points (BP) above about 130° C. The compounds which are regarded as being covered by the term "water-soluble NaCMC" include not only NaCMC types which have one kind of substituent, but also mixed ethers which essentially comprise the ionic sodium carboxymethyl groups, i.e. in an amount of not less than 75% by weight, and additionally also non-ionic substituents, such as methyl, hydroxyethyl and/or hydroxypropyl groups or further ionic substituents, such as sulfonic acid ethyl, phosphonic acid methyl or N,N-dialkylaminoethyl groups.

The cellulose used is either of natural origin, for example, cotton linters or wood pulp, or is in a regenerated form, for example, in the form of cellulose hydrate. Before beginning the reaction, the cellulose should have a particle size which is, if possible, less than about 2.5 mm, particularly less than about 1 mm. This particle size can be obtained, for example, by grinding cellulose which is supplied in a longer-fibered form into "powders".

The bases used for alkalization preferably include alkali metal hydroxides, especially NaOH, but also potassium hydroxide (KOH) or lithium hydroxide (LiOH) - in a solid or a dissolved form as an aqueous alkali metal hydroxide solution (e.g. as a 20 to 50% by weight solution). If alkali metal hydroxides are used as the bases, the amount thereof is, in general, from about 1.0 to 8 moles, particularly from about 1.3 to 6 moles, per mole of cellulose (calculated on the basis of an anhydro-D-glucose unit). The amount of the etherifying agents, essentially comprising alkyl monochloroacetate is preferably in the range of about 0.4 to 5 moles, particularly in the range from about 0.5 to 2.5 moles, per mole of cellulose. However, in the production of mixed ethers the etherifying agent also includes compounds, such as methyl chloride, ethylene oxide, propylene oxide, chloroethanesulfonic acid, chloromethanephosphonic acid or 1-N,N-diethylamino-2-chloroethane. The amount of solvent mixture composed of water and, appropriately, a water-miscible, in particular a water-soluble organic solvent, for example, isopropanol or tert.-butanol, is preferably in the range of about 3 to 25 parts by weight, per part by weight of cellulose, the proportion of water contained in the mixture generally ranging from about 2.5 to 40 percent by weight; this proportion of water should be from about 3 to 25 moles, per mole of cellulose. In many cases, it may be favorable to use, as the organic solvent, the type of alcohol which is also generated in the hydrolysis of the alkyl mono-chloroacetate. For example, it is possible to use isopropanol as the organic solvent, together with isopropyl monochloroacetate as the etherifying agent, so that the working-up of the solvent mixture alcohol/water results in uniform fractions, which can easily be returned into the process.

When carrying out the process according to the present invention, cellulose is appropriately first alkalized in a mixture composed of organic solvent, water and alkali metal hydroxide. The etherifying agent(s) is (are) subsequently added in one or several step(s)—depending upon the type of etherifying agent(s) employed. It is, however, also possible to carry out alkalization in the absence of an organic solvent which is, in that case, added in the etherifying step(s). As a rule, all steps are operated while mixing well. The separate alkalizing step is usually carried out at room temperature, at least 0° C., particularly from about 15° to 35° C., while the etherification takes place particularly successfully at a temperature between 30° and 120° C., especially up to about 85° C. The reaction times required are generally about 15 to 60 minutes in the alkalizing step and between about 30 minutes and 4 hours in the etherifying step, depending upon the reaction temperature. The crude product is first freed from the bulk of the liquid components in a separating device (e.g. a centrifuge), preferably after adding acid, until the unconsumed bases have been neutralized. The crude product can then, optionally, be subjected to an extraction treatment to remove adhering salts. Finally, the product is dried and, if desired, ground, mixed with further components or granulated.

These methods of working-up, purifying and post-treating are those which are customary in the chemistry of cellulose ethers and, therefore, do not require a detailed description.

The use of alkyl monochloroacetates as components of the etherifying agent in the preparation of water-soluble NaCMC leads, in particular, to the following advantages:

The uniformity of substitution on the cellulose molecules is at least comparable to the uniformity of substitution which can be obtained with monochloroacetic acid as the etherifying agent, and is definitely better than the result obtained with sodium monochloroacetate.

Frequently, viscosities which are markedly higher than about 100,000 mPa.s (measured in a 1.8% strength aqueous solution, according to Hoeppler) can be observed and, as a rule, these high viscosities do not substantially decrease, even in aqueous salt solutions.

The etherifying agent can be stored and handled safely without difficulty, i.e. it is neither particularly sensitive to cold (FP $\leq -25°$ C.), nor particularly readily evaporated (BP $\geq 130°$ C.) and, in addition, it is less caustic and aggressive than the free acid.

The addition (metering) into the reaction mixture is without problems, since a local drop of the pH value to the acid range, which is possible if monochloroacetic acid is added, cannot occur in this case. Shifting of the pH value into the acid range is undesirable, since, on the one hand, it results in a decomposition of the polymer chain of the cellulose molecules and is thus one of the causes for a reduction of viscosity and, on the other hand, it destroys the alkali cellulose formed.

As compared with a reaction procedure which comprises initially mixing the cellulose with the etherifying agent and subsequently alkalizing, an improved substitution yield per mole of etherifying agent employed is obtained and fewer by-products of the reaction (for example, glycolic acid/sodium glycolate) are formed, which must be removed from the mixture organic solvent/water by a complicated treatment after carrying out the reaction.

In the examples which follow, parts by weight are related to parts by volume as the kilogram (kg) is related to the cubic decimeter ($dm^3$), and percentages refer to weight. The viscosity values given were determined in a Hoeppler falling-ball viscosimeter in a 1.8% strength aqueous solution at 20° C. (starting out from a dry cellulose ether), or in a rotary viscosimeter in a 1% strength aqueous solution at 20° C. and at a shear gradient of $\tau \cdot D = 10^1$. "DS" is the degree of substitution, i. e. the average numer of substituted OH groups per anhydro-D-glucose unit; for cellulose, the DS is in the range from 0 to 3. The resistance to salt water (SR value) is determined in such a way that the viscosity of the sample in an aqueous NaCl solution is compared with its viscosity in an aqueous solution. When determining the SR values, a rise in viscosity is referred to as "very good", a constant viscosity as "good", a slight drop as "sufficient" and an increased drop as "less suitable". The water-insoluble residue of the sample (WIR values) is determined by a gravimetric method and is indicated in %.

EXAMPLE 1

COMPARATIVE EXAMPLES C1 and C2

In an agitator vessel, 691 parts by weight (13.1 parts by weight per part by weight of cellulose) of an 87% strength aqueous isopropanol are mixed with 53 parts by weight of wood pulp having an average degree of polymerization of 1,150 (substantially ground to a particle size below 0.5 mm) and with 34.5 parts by weight of NaOH (2.8 moles per mole of cellulose). The alkalization is run for 30 minutes at 20° C. Then 54.7 parts by weight of isopropyl monochloroacetate (1.3 moles per mole of cellulose) are added. In two parallel experiments, monochloroacetic acid (C1) and sodium monochloroacetate (C2) are employed as the etherifying agents which are added in the same molar proportions, however, in the alkalization of Comparative Example C2, the molar quantity of NaOH is reduced to 1.5 moles. The reaction mixture is, in each case, heated for 30 minutes to 66° C. and is maintained at this temperature for 60 minutes. After 10 minutes and then successively at 10 minute intervals, a sample is taken from each reaction dispersion to determine the DS of the NaCMC. It is found that, for a period of up to about 70 minutes (from the beginning of heating-up), the salt used as the etherifying agent gives a noticeably faster reaction than the alternatively used acid and ester, respectively. In some cases, an about 50% higher DS is observed after a period of about 30 to 40 minutes, under the given conditions of reaction. After this period, the DS very quickly approaches a limiting value. When the ester is used as the etherifying agent, substitution obviously proceeds more uniformly; even after a period of about 70 minutes, a further substitution is still possible and the DS values obtainable are the highest of the three alternatives. In the case of the acid used as the etherifying agent, the course of substitution is similar to that of the ester within the period of time of about 30 to 60 minutes; however, the degrees of substitution obtainable are slightly higher. If the methyl or ethyl monochloroacetate is used instead of the isopropyl monochloroacetate an almost identical course of substitution is observed.

TABLE 1

| Etherifying agent | Degree of substitution (DS) after an etherification period of (in minutes) | | | | | | | | |
|---|---|---|---|---|---|---|---|---|---|
| | 10 | 20 | 30 | 40 | 50 | 60 | 70 | 80 | 90 |
| Sodium monochloroacetate | 0.06 | 0.25 | 0.60 | 0.70 | 0.75 | 0.78 | 0.80 | 0.85 | 0.85 |
| Monochloroacetic acid | 0.05 | 0.16 | 0.43 | 0.56 | 0.67 | 0.72 | 0.78 | 0.86 | 0.87 |
| Isopropyl monochloroacetate | 0.03 | 0.22 | 0.38 | 0.53 | 0.63 | 0.67 | 0.82 | 0.88 | 0.92 |

EXAMPLES 2 to 10

An 87% strength aqueous isopropanol is placed into an agitator vessel and cellulose having an average particle size below 0.5 mm (after grinding) is added. In Examples 4, 7 and 10, the agitator vessel is repeatedly evacuated and the mixture is superposed with nitrogen. Then, NaOH in a dissolved or solid form is added and alkalization is run for 30 minutes at 20° C. Isopropyl monochloroacetate, as the etherifying agent, is removed from a measuring vessel into the agitator vessel, under a slight vacuum and the dispersion—in Examples 4, 7 and 10 after again superposing with nitrogen—is heated for 30 minutes to 66° C. and maintained at this temperature for 60 minutes. In Examples 2, 5 and 8, a 15% strength aqueous $H_2O_2$ solution is added to the dispersion to effect a reduction of viscosity and the mixture is then caused to post-react for 30 minutes. After cooling to 40° C., the product is, in all examples, neutralized to a pH value of about 8, using from 0.5 to 1 part by volume of glacial acetic acid. The resulting NaCMC is separated, washed and dried. The amounts of reactants used and the results of the examples are compiled in the table which follows. The types of cellulose used are as follows:

Type A : Wood pulp having an average degree of polymerization of 550.

Type B : Cotton linters having an average degree of polymerization of 2,500.

Type C : Wood pulp having an average degree of polymerization of 1,600.

NaOH is used either as a 50% strength aqueous solution (Kind X) or in a solid form (Kind Z). The proportions of water given include the amounts contained in the 87% strength isopropanol and in the aqueous NaOH solution.

Compared with the good to very good commercial products available in the NaCMC field, which are produced according to the prior art processes, the NaCMC types prepared according to the process of the present invention show a comparable and, in some cases, even better resistance to salt water, and in Examples 4 and 7, viscosity values are obtained which are markedly higher than the hitherto known maximum values of about 50,000 (in a 1.8% strength solution) or 4,000 (in a 1% strength solution), respectively. The aqueous solutions of the products of the present invention are just as clear as those of good to very good commercial products. The water-insoluble residue is within the usual range and is negligible in view of the advantages of the extremely high viscosities obtainable.

2. A process as defined in claim 1, wherein said organic solvent is added in said alkalyzing step.

3. A process as defined in claim 1, wherein said organic solvent is added in said etherifying step.

4. A process as defined in claim 1, wherein said alkalyzing step is carried out at a temperature of at least about 0° C.

5. A process as defined in claim 4, wherein said alkalyzing step is carried out at a temperature in the range from about 15° to 35° C.

6. A process as defined in claim 1, wherein said etherifying step is carried out at a temperature in the range from about 30° to 120° C.

7. A process as defined in claim 6, wherein said etherifying step is carried out at a temperature in the range from about 30° to 85° C.

8. A process as defined in claim 1, wherein said alkyl monochloroacetate comprises alkyl groups having from 1 to 4 carbon atoms.

9. A process as defined in claim 8, wherein said alkyl monochloroacetate is selected from the group consisting of methyl, ethyl and isopropyl monochloroacetate.

10. A process as defined in claim 1, wherein said organic solvent is selected from the group consisting of isopropanol and tert.-butanol.

11. A process as defined in claim 1, wherein said organic solvent mixture comprises from about 3 to 40 percent by weight water.

12. A process as defined in claim 1, wherein said

TABLE 2

| | Objective with respect to | | Amounts of Reactants used | | | | | | |
|---|---|---|---|---|---|---|---|---|---|
| | | | 87% strength aqueous isopropanol | | Proportion of water in mole | Cellulose | | NaOH | |
| Example | Degree of Etherification | Viscosity | in p.b.v. | in p.b.w. per p.b.w. of cellulose | per mole of cellulose | Type | Amount in p.b.w. | Kind | Amount in p.b.w. | Amount in mole per mole of cellulose |
| 2 | low | low | 450 | 12.3 | 18.58 | A | 30.0 | X | 27.90 | 2.0 |
| 3 | low | medium | 450 | 12.3 | 18.16 | A | 30.0 | X | 25.10 | 1.8 |
| 4 | low | high | 455 | 12.4 | 14.55 | B | 30.0 | Z | 12.55 | 1.8 |
| 5 | medium | low | 432 | 12.3 | 19.58 | A | 28.8 | X | 33.50 | 2.5 |
| 6 | medium | medium | 450 | 12.3 | 18.58 | A | 30.0 | X | 27.90 | 2.0 |
| 7 | medium | high | 460 | 12.5 | 14.71 | B | 30.0 | Z | 15.40 | 2.3 |
| 8 | high | low | 435 | 12.5 | 14.70 | A | 28.4 | Z | 27.70 | 4.2 |
| 9 | high | medium | 435 | 12.5 | 14.70 | C | 28.4 | Z | 27.70 | 4.2 |
| 10 | high | high | 435 | 12.5 | 14.70 | B | 28.4 | Z | 27.70 | 4.2 |

| | Amounts of Reactants used | | | Characteristics of the NaCMC | | | | |
|---|---|---|---|---|---|---|---|---|
| | Isopropyl monochloroacetate | | 15% strength aqueous H₂O₂ solution in p.b.w. | | Viscosity of a | | | |
| Example | Amount in p.b.w. | Amount in mole per mole of cellulose | | DS | 1.8% strength solution | 1% strength solution | SR | WIR |
| 2 | 14.30 | 0.50 | 4.0 | 0.40 | 27 | — | very good | 0.60 |
| 3 | 19.00 | 0.80 | — | 0.67 | 270 | — | very good | 0.75 |
| 4 | 19.00 | 0.80 | — | 0.67 | 370 000 | 12 700 | sufficient | 2.20 |
| 5 | 27.50 | 1.25 | 4.6 | 0.91 | 14 | — | good | 0.64 |
| 6 | 21.40 | 0.90 | — | 0.73 | 230 | — | very good | 0.59 |
| 7 | 23.75 | 1.10 | — | 0.81 | 310 000 | 9 400 | sufficient | 0.54 |
| 8 | 45.00 | 2.00 | 5.6 | 1.23 | 23 | — | good | 0.96 |
| 9 | 45.00 | 2.00 | — | 1.17 | 6 530 | — | good | 1.10 |
| 10 | 45.00 | 2.00 | — | 1.30 | 22 340 | — | good | 1.20 | p.b.v. = parts by volume
p.b.w. = parts by weight

I claim:

1. A process for preparing water-soluble sodium carboxymethyl cellulose, comprising the steps of:
alkalyzing cellulose in an aqueous-alkaline dispersion to produce an alkali cellulose; and
subsequently etherifying said alkali cellulose, with a neutral etherifying mixture comprising alkyl monochloroacetate, in the presence of an organic solvent to produce a sodium carboxymethyl cellulose.

organic solvent comprises an alcohol produced during the hydrolysis of said alkyl monochloroacetate.

13. A process as defined in claim 12, wherein said organic solvent comprises isopropanol and said alkyl monochloroacetate comprises isopropyl monochloroacetate.

14. A process as defined in claim 1, wherein said sodium carboxymethyl cellulose comprises at least about 75% by weight of ionic sodium carboxymethyl cellulose.

15. A process as defined in claim 14, wherein said sodium carboxymethyl cellulose further comprises non-ionic substituent groups.

16. A process as defined in claim 15, wherein said non-ionic substitutent groups are selected from the group consisting of methyl, hydroxyethyl and hydroxypropyl.

17. A process as defined in claim 14, wherein said sodium carboxymethyl cellulose further comprises other ionic substituents selected from the group consisting of sulfonic acid ethyl, phosphonic acid methyl and N,N-dialkylamino ethyl groups.

18. A process as defined in claim 1, wherein said etherifying mixture comprises:

(a) from about 1.0 to 8 moles of alkali metal hydroxide, per mole of cellulose;
(b) from about 0.4 to 5 moles of alkyl monochloroacetate, per mole of cellulose;
(c) from about 3 to 25 moles of water, per mole of cellulose; and
(d) from about 3 to 25 parts by weight of organic solvent mixture comprising water and an organic solvent, per part by weight of cellulose.

19. A process as defined in claim 18, wherein said etherifying mixture comprises from about 1.0 to 6 moles of alkali metal hydroxide, per mole of cellulose.

20. A process as defined in claim 18, wherein said etherifying mixture comprises from about 0.5 to 2.5 moles of alkyl monochloroacetate, per mole of cellulose.

* * * * *